United States Patent [19]

Takahashi

[11] 3,915,725

[45] Oct. 28, 1975

[54] PROCESS FOR PRODUCING HOLLOW SPHERICAL AGGREGATES OF XONOTLITE

[75] Inventor: Akira Takahashi, Ikeda, Japan

[73] Assignee: Agency of Industrial Science & Technology, Tokyo, Japan

[22] Filed: Nov. 27, 1973

[21] Appl. No.: 419,403

Related U.S. Application Data

[63] Continuation-in-part of Ser. No. 131,424, April 5, 1971, abandoned.

[30] Foreign Application Priority Data

Apr. 28, 1970 Japan.............................. 45-36567

[52] U.S. Cl................................. 106/120; 106/306
[51] Int. Cl.² ........................................ C04B 1/00
[58] Field of Search........................... 106/120, 306

[56] References Cited

UNITED STATES PATENTS

| 3,501,324 | 3/1970 | Kubo | 106/120 |
| 3,679,446 | 7/1972 | Kubo | 106/120 |

*Primary Examiner*—J. Poer

[57] ABSTRACT

Spherical aggregates each having ribbon-shaped crystals of xonotlite intertwined is produced by hydrothermally reacting a slurry of silicic acid, and lime and spraying the resultant suspension under conditions of high temperature and pressure. A shaped article are produced by mixing the said spherical aggregates with a biding agent, shaping the resultant mixture to form, pressurizing the shaped mixture and drying the compressed shaped mixture.

2 Claims, No Drawings

PROCESS FOR PRODUCING HOLLOW SPHERICAL AGGREGATES OF XONOTLITE

REFERENCE TO RELATED APPLICATION:

This is a continuation-in-part application of my co-pending application U.S. Ser. No. 131,424 filed April 5, 1971 now abandoned.

This invention relates to a process for producing spherical xonotlite aggregates by causing ribbon-shaped crystals of xonotlite to be intertwined so as to give birth to spheres each possessed of a sparse inner texture and a low bulk density and to a process for producing a shaped article of a powder composed of said spherical xonotlite aggregates.

Heretofore, compounds formed of silicic acid and calcium oxide have been utilized for the manufacture of cement, autoclaved light-weight concrete (ALC) and refractories. Silicic acid and calcium compounds which are superior in refractory and heat insulating property and in mechanical strength as well have been produced by the hydrothermal synthesis and used extensively, in a powdery form or a molded form, not only for said purposes but also as construction materials and as fillers for plastics and rubbers.

The aforementioned compounds of silicic acid and calcium oxide which have thus been put to actual use are tobermorite ($5CaO \cdot 6SiO_2 \cdot 5H_2O$), gelled tobermorite and xonotlite.

Production of tobermorite requires a procedure which, for example, comprises preparing a mixture containing CaO and $SiO_2$ in amounts to give a $CaO/SiO_2$ molar ratio of 0.83 and subjecting the mixture to a hydrothermal treatment at about 175°C under a pressure of about 8 Kg/cm² for about 24 hours. Production of xonotlite, on the other hand, necessitates a procedure which, for example, comprises preparing a mixture containing CaO and $SiO_2$ in amounts to give a $CaO/SiO_2$ molar ratio of about 1.0 and subjecting the mixture to a hydrothermal treatment at about 210°C under a pressure of about 15 Kg/cm² for about 20 to 50 hours.

The hydrothermal treatments consequently produce slurries which predominantly contain tobermorite in the former case and xonotlite in the latter case respectively.

To obtain the tobermorite and the xonotlite in the form of a dry powder, there may generally be employed a method which comprises the steps of molding the said slurries under pressure to obtain molded pieces and subsequently pulverizing the molded pieces to a desired particle size or a method which comprises squeezing the slurries by means of a press to be divested of water, drying the resulting wet powder to obtain the desired dry powder.

In obtaining shaped articles of these compounds, a common practice generally followed consists in having a suitable reinforcing agent or binder incorporated into the raw materials prior to said stage of hydrothermal treatment for the purpose of imparting improved physical properties to the shaped articles to be consequently produced.

For the production of such shaped articles, one of the typical methods suggested heretofore to the art is based on a procedure described below.

This procedure comprises the steps of mixing a highly reactive soluble silicic acid and quick lime (or slaked lime) at a $CaO/SiO_2$ molar ratio of not more than 1.0, kneading the mixture in cold water or hot water and then gelling it by application of heat under agitation, shaping the gelled mixture such as in a molding frame, placing the molded gel in an autoclave to be subjected to a treatment at 175°C under pressure of about 8 kg/cm² for 8 to 24 hours and removing the shaped article consequently formed from the autoclave and drying it. Some of the insulating materials are produced in accordance with this method. In short, this method obtains desired shaped articles by first producing gelled mixtures and subsequently subjecting these mixtures to the molding treatment. Thus, this method entails a long time of treatment for molding and suffers from inefficiency of operation because of inevitable use of enclosing members and molding frames to set in position the gelled mixture within the autoclave. Further, this method has a disadvantage that the shaped articles to be finally obtained thereby do not have homogeneous quality because the pressure and temperature cannot easily be maintained uniformly throughout the autoclave interior.

The primary object of this invention is to provide a process for producing spherical aggregates having ribbon-shaped crystals of xonotlite intertwined so as to give rise to spheres of a form which excels in physical properties, particularly in terms of freedom from heat contraction, and enjoys free-flowing property and good shaping property.

It is also an object of this invention to provide a process for producing shaped articles of said spherical aggregates excellent in physical properties by a simple reaction step capable of being completed in an amply shortened reaction time.

Other objects and other characteristics of the present invention will become apparent from a further disclosure of this invention to be given herein below.

The process of the present invention is free from the disadvantages which have been suffered by the methods heretofore proposed to the art. It produces spherical aggregates having ribbon-shaped crystals of xonotlite intertwined so as to give rise to spheres which are possessed of a sparse inner texture and a low bulk density and which consequently excel in compressionmolding property. These spherical aggregates microscopically constitute the individual particles which collectively form a powder as a microscopic substance. Shaped articles enjoying outstanding physical properties are obtained by using the powder which is composed of these spherical aggregates.

The process of this invention will further be described in detail hereinbelow.

At first, silicic acid, lime and water are mixed.

For this purpose, silica sand or noncrystalline silica which is divided finely to a particle diameter capable of passing a sieve of a mesh size of about 325 can advantageously be used as a silicic acid. An increase in particle diameter beyond the stated level is not advantageous, for it only entails a proportional increase in the length of time required for the reaction involved. Then, the resultant mixture is converted into a slurry, placed in an autoclave and pressurized with a saturated steam to undergo a hydrothermal reaction. This hydrothermal reaction occurs between the calcium ion ($Ca^{++}$) and the silicate ion ($H_2SiO_4^{--}$) and it is accelerated by heating the mixture under an increased pressure while under simultaneous agitation within the autoclave. Consequently, the time for the hydrothermal reaction is shortened to about one third to one half of the time required by the conventional method. The mixture of silicic acid and lime can be converted to tobermorite or xonotlite, whichever, is desired, with the choice depending on the selection of the ratio of silicic acid to lime and the reaction temperature. Xonotlite is chiefly produced when a mixture consisting of 0.8–1.1 mols of quick lime per each mol of silicic acid is subjected to the hydrothermal reaction at a temperature exceeding 210°C, for example. A mixture containing not more than 0.8 mol of quick lime per each mol of silicic acid chiefly produces tobermorite when it is subjected to the hydrothermal reaction at a temperature not exceeding 200°C. The reaction time has a close relation with the reaction temperature. For example, a reaction which has required 2 hours of time at a reaction temperature of 200°C may be brought to completion in about 5 minutes when the temperature is heightened to 250°C.

The compound of silicic acid and calcium consequently formed in the hydrothermal reaction product can be taxonomically and morphologically identified by means of electron micrograph, infrared spectrophotometry, differential thermal analysis, etc.

It has been confirmed that the compound to be produced by the hydrothermal reaction performed according to the process of this invention is xonotlite whose crystals are ribbon-shaped and each measure $10 - 25\ \mu$ in length, $0.05 - 0.3\ \mu$ in width and $0.01 - 0.1\ \mu$ in thickness, with the long-short ratio exceeding 100.

The suspension consequently formed within the autoclave at the high temperature and pressure and containing said xonotlite is then subjected to spray drying by utilizing its own high temperature and pressure, with the result that xonotlite is dried to give birth to spherical aggregates $10 - 200\ \mu$ in diameter having the aforementioned numerous ribbon-shaped crystals intertwined.

These aggregates are found to be hollow spheres which have said crystals intertwined particularly densely on the peripheral portion and increasingly more sparsely toward the center. These aggregates exhibit properties of a powder, such as high free-flowing property, a small angle of repose and an extremely low bulk density on the order of 0.08, for example. They also excel in molding property. The pressure required for molding these aggregates is about 20 kg/cm² for a molded article of a specific gravity of 0.4 and about 80 kg/cm² for that of a specific gravity of 1.0.

The process of shaping described so far may well be regarded as belonging to the class of so-called dry methods. If a shaped article having a specific gravity of 0.7 is desired to be obtained by the conventionally known wet method, however, the pressure required is not less than 200 kg/cm².

A viscous binder such as, for example, soluble silicic acid, Kaolin, bentonite or water glass may be added to the suspension held inside the autoclave at the high temperature and pressure prior to the step of spray drying in an amount of 5 percent by weight based on the suspension, for example. The binder thus added serves to increase the density with which crystals of xonotlite are intertwined in the peripheral portion of each aggregate.

The particle diameter of the aggregates formed by the process described above ranges, as described previously, from about 10 to about 200 $\mu$, depending on the conditions of spray drying.

The shaped articles of said spherical aggregates obtained by the process of this invention have higher strength than those formed by the conventional wet method. They exhibit a bending strength about 3 times as high as those of the conventional method. The spherical aggregates of the aforementioned description cannot be obtained when the suspension formed in the autoclave at the high temperature and pressure is allowed to fall to normal room temperature and pressure and then subjected to spray drying instead of being directly subjected to spray drying.

The table below compares the physical properties of a powder which is obtained by first dehydrating the slurry and then drying the dehydration product by an ordinary known method such as, for example, drying by use of a dryer with the physical properties of the powder composed of the spherical aggregates obtained by subjecting the suspension at the high temperature and pressure to spray drying according to the process of this invention.

Table 1

| | Bulk density (g/cc) | Compressibility | Angle of repose | Angle of spatula |
|---|---|---|---|---|
| Powder by process of this invention | 0.05–0.08 | 60.4 | 61 | 88 |
| Powder by conventional drying | 0.08–0.10 | 18.4 | 30 | 24 |
| | Cohesiveness | Index of flowability | Free-flowing property | Bridging |
| Powder by process of this invention | 96.7 | 13 | Quite inferior | Liable to occur |
| Powder by conventional drying | 2.5 | 85 | Good | Unable to occur |

Now, a process for producing a shaped article by using the spherical aggregates obtained according to this invention will be described.

Since the aggregates produced by the process of this invention have excellent shaping property, a shaped article possessed of highly desirable properties can be obtained by combining them with a small proportion of binder component, shaping them to a desired form under pressure by means of a press or roll and finally drying the molded product. Any known binding agent may be used in this case. For example, Kaolin, silicic acid, water glass, cement and bentonite may be used either individually or in the form of a mixture of two or more members. Where the shaped article is desired to possess an increased strength, incorporation of an inorganic fiber such as, for example, glass wool, asbestos or slag wool will serve the purpose. Compared with the shaped article obtained by any known method such as a method involving the process of slurry dehydration, the shaped article obtained by this process enjoys homogeneity of properties because of uniform distribution of powder particles and has an advantage that the shaped article can easily be produced in any form desired.

The shaped article obtained by the process of this invention has a structure such that spherical aggregates each composed of numerous ribbon-shaped crystals are stably bonded to one another by the medium of the binder component. Thus, it has a small bulk density, low thermal conductivity, high refractoriness and high strength and can be used as construction materials suitable for a wide range of applications.

The present invention is further illustrated by the following examples but is not limited thereto.

EXAMPLE 1

52 parts of finely ground silicious sand, 48 parts of quick lime and 800 parts of water were blended and stirred to produce a stock slurry. The slurry was then charged into an autoclave drum and reacted hydrothermally at a temperature of about 200°C in saturated steam of 15 kg/cm². During the reaction, the slurry in the drum was stirred by means of stirring fins so as to prevent the precipitation of the reaction product and promote the reaction and the crystallization. After about 3 hours' reaction, the X-ray diffraction patterns of the reaction product indicated that the product was xonotlite crystals and that the starting materials had been completely reacted. Also, infrared spectrometry and differential thermal analysis indicated that the product consisted solely of xonotlite crystals. Electron microscopic observation of the crystals showed that the grain size of the crystals was about 2 – 30 μ in length, 0.01 – 0.3 μ in width and 0.01 – 0.2 μ in thickness. The various physical properties of the crystals are shown in Table 2 below.

Table 2

| Bulk Density | 0.082 g/cm³ |
|---|---|
| True Specific Gravity | 2.79 g/cm³ |
| Specific Surface Area | 68 m²/g |
| Dehydration Temperature | 680 – 700°C |
| Refractive Index | 1.583 |
| Color | white |
| Coefficient of Contraction (after calcined at 1100°C for 3 hours) | 1% |

The suspension containing the reaction product obtained as above was then passed, while maintaining it at high temperature and high pressure, into the reserving tank from which the suspension was sprayed through a nozzle of a spray-drier by taking advantage of the high pressure, and dried with hot-air while the sprayed suspension fell downwardly. The thus dried fine particles had a bulk density of 0.08 kg/cm³ and a grain size of about 10 – 200 μ and were spherical in shape, the inner portion thereof consisting of xonotlite crystals in sparse random arrangement.

EXAMPLE 2

A liquid mixture of 3 parts of bentonite, 3 parts of colloidal silica (a 30% aqueous solution of $SiO_2$), 8 parts of asbestos and 100 – 400 parts of water was prepared and mixed thoroughly with 100 parts of xonotlite powder prepared by the procedure as described in Example 1. The resulting mixture was then pressed into plates which were thereafter dried at a temperature of 150°C for 2 hours. The thus obtained plates were found to comprise spherical aggregate of xonotlite crystals which were strongly bonded to each other by the mutual intertwining action and the binder. The physical properties of the plates in comparison with those of the plate produced by the conventional process are shown in Table 3 below in which A, B and C are the plates obtained where the pressure was of 15 kg/cm², 20 kg/cm² and 25 kg/cm² and the quantity of water was 400 parts, 250 parts and 100 parts respectively.

Table 3

| | Physical Properties of Pressed Plates | | | |
|---|---|---|---|---|
| | Plates obtained by the conventional process | Plates produced by the process of this invention | | |
| | | (A) | (B) | (C) |
| Bulk Density (g/cm³) | 0.22 | 0.21 | 0.42 | 0.60 |
| Thermal Conductivity (Kcal/mh°C) | 0.053 | 0.042 | 0.055 | 0.068 |
| Refractoriness (°C) | 650 | 1100 | 1100 | 1100 |
| Bending Strength (kg/cm²) | 3 | 8 | 36 | 65 |
| Compressive Strength (kg/cm²) | — | 12 | 42 | 91 |

EXAMPLE 3

52 parts of finely ground silicious sand, 48 parts of quick lime and 500 parts of water were blended and stirred to produce a stock slurry. The slurry was then charged into an autoclave drum and reacted hydrothermally at a temperature of about 230°C in saturated steam of 28 kg/cm² pressure for about 1 hour. During the reaction, the slurry in the drum was stirred by means of stirring fins so as to prevent the precipitation of the reaction product and to promote the reaction and the crystallization. After completion of the hydrothermal reaction, the X-ray diffraction patterns of the product indicated that the product consisted solely of xonotlite crystals and that the starting materials had been completely reacted. Also, infrared spectrometry and differential thermal analysis indicated that the product consisted solely of xonotlite crystals. Electron microscopic observation of the crystals showed that the crystals were rods or ribbons having the grain size of about 3 – 10 μ in length, 0.1 – 0.2 μ in width and 0.05 – 0.1 μ in thickness. The various physical properties of the crystals are shown in Table 4 below.

Table 4

| Bulk Density | 0.095 g/cm³ |
|---|---|
| True Specific Gravity | 2.79 g/cm³ |
| Specific Surface Area | 82 m²/g |
| Dehydration Temperature | 680 – 750°C |
| Refractive Index | 1.583 |
| Color | white |

The suspension obtained from the above reaction was then passed into a reserving tank while keeping the high temperature and pressure. To the suspension in the tank was then added a liquid mixture of 20 parts of colloidal silica (a 20% aqueous solution of $SiO_2$) and 5 parts of kaolin followed by thoroughly stirring. The resulting mixture was sprayed through a nozzle of a spray-drier by utilizing the high temperature and pressure and dried at a temperature of about 200°C to produce fine particles consisting mainly of xonotlite. The resulting particles were hollow, spherically aggregated sheels consisting of xonotlite crystals and kaolin crystals packed densely together in random arrangement, the space between them being filled with glass state silica. The thickness of the resulting shell was found to be about ½ to 1/5 the outer diameter of the whole spherical shell.

What is claimed is:

1. A process for producing a shaped article, comprising the steps of:
   1. producing spherical aggregates each having ribbonshaped crystals of xonotlite intertwined as a hollow sphere measuring from 10 $\mu$ to 200 $\mu$ in outside diameter and having a sparse inner texture and a low bulk density by:
      a. mixing silicic acid, lime and water in amounts to give a silicic and/lime molar ratio between 0.8 and 1.1 and forming a slurry thereof;
      b. placing the resultant slurry in an autoclave and pressurizing said slurry with saturated steam at 200°C. – 250°C. and thereby producing a suspension containing chiefly ribbon-shaped xonotlite crystals having a length of 10 $\mu$ to 25 $\mu$, a width of 0.05 to 0.3 $\mu$, a thickness of 0.01 to 0.1 $\mu$ and a long-short ratio exceeding 100;
      c. depriving the suspension of pressure by spray drying the suspension at the high temperature from the autoclave;
   2. mixing recovered spherical aggregates from Step (c) with a small amount of at least one binding agent selected from the group consisting of bentonite, colloidal silica and cement and water;
   3. molding the resultant mixture of Step (2) to a molded shape;
   4. pressuring the molded mixture of aggregates of Step (3); and
   5. drying the pressurized shape mixture.

2. The process of claim 1, wherein at least one member selected from the group consisting of glass wool, asbestos and slag wool is added as a reinforcing agent in the form of inorganic fibers to said spherical aggregates of Step (2).

* * * * *